(12) United States Patent
Blount

(10) Patent No.: US 7,129,291 B2
(45) Date of Patent: Oct. 31, 2006

(54) FLAME RETARDANT UREA-BIO BASED URETHANE COMPOSITIONS

(76) Inventor: David H. Blount, 6728 Del Cerro Blvd., San Diego, CA (US) 92120

( * ) Notice: Subject to any disclaimer, the term of this patent is extended or adjusted under 35 U.S.C. 154(b) by 454 days.

(21) Appl. No.: 10/687,899

(22) Filed: Oct. 17, 2003

(65) Prior Publication Data
US 2004/0082712 A1 Apr. 29, 2004

Related U.S. Application Data

(63) Continuation-in-part of application No. 09/941,402, filed on Aug. 30, 2001, now abandoned, which is a continuation-in-part of application No. 09/532,646, filed on Mar. 22, 2000, now Pat. No. 6,348,526, which is a continuation-in-part of application No. 08/801,776, filed on Feb. 14, 1997, now Pat. No. 5,788,915, and a continuation-in-part of application No. 08/723,779, filed on Sep. 30, 1996, now Pat. No. 5,854,309.

(51) Int. Cl.
*C08G 18/28* (2006.01)
*C08G 18/08* (2006.01)

(52) U.S. Cl. ...................... 524/591; 524/590

(58) Field of Classification Search ........... 524/591, 524/590
See application file for complete search history.

(56) References Cited

U.S. PATENT DOCUMENTS

| 3,332,896 A | * | 7/1967 | Burns et al. | 527/302 |
| 4,383,078 A | * | 5/1983 | Blount | 524/733 |
| 4,990,586 A | * | 2/1991 | Case | 528/64 |

* cited by examiner

*Primary Examiner*—Tae H. Yoon

(57) ABSTRACT

Flame retardant urethane compositions of this invention are produced by reacting a urea and/or urea condensate, a bio based compound and a polyisocyanate. The urea condensation compositions are produced by heating urea or heating urea to produce isocyanic acid and/or cyanic acid which reacts with urea to form urea condensates. The bio based compound are environmentally friendly, replaceable compound such as vegetable oils, molasses, sugar, lignin and hemi-cellulose. The urea and/or urea condensation compounds may be mixed with or reacted with carbonization auxiliaries. For example, polyurethane foams can be rendered less flammable with urea and/or urea condensation compounds and utilized as insulating and sound proofing materials.

3 Claims, No Drawings

FLAME RETARDANT UREA-BIO BASED URETHANE COMPOSITIONS

This patent application is a continuation-in-part of patent application Ser. No. 09/941,402 filed Aug. 30, 2001 now abandoned, which is a continuation-in-part of No. 09/532,646 filed Mar. 22, 2000 now U.S. Pat. No. 6,348,526; which is a continuation-in-part of No. 08/801,776 filed Feb. 14, 1997, now U.S. Pat. No. 5,788,915, which is a continuation-in-part of No. 08/723,779 filed Sep. 30, 1996 now U.S. Pat. No. 5,854,309.

FIELD

The invention concerns urea compounds and bio based compounds reacted with polyisocyanates to produce flame retarded urethane products. The invention also concerns their preparation and use. The urea compounds with bio based compounds reacted with polyisocyanates are useful to produce flame retardant urethane plastics. The urea compounds and may be reacted with phosphorus and/or boron containing compounds to produce other flame retardant compounds. The urea compounds may also be reacted with aldehydes to produce amino condensation-aldehyde resins for use with bio based compounds a flame retardant urethanes.

BACKGROUND

The urea and urea compounds produced by heating of urea to produce urea condensation compounds, such as a mixture of urea, biuret, cyanuric acid and cyamelide, is known in the arts, but the use of these compounds with bio based compounds as a flame retardant is novel. The urea condensation compounds and their phosphorus and/or boron salts are used as flame retardant compounds in plastics and natural products. Urea and melamine were utilized as a flame retardant compound by Fracalossi, et al., in U.S. Pat. No. 4,385,131. Melamine was utilized as flame retardant compounds in polyurethanes by Yukuta, et al., in U.S. Pat. No. 4,221,875 and by Grinbergs et al., in U.S. Pat. No. 4,745,133. Amino phosphates was utilized by Blount in U.S. Pat. No. 5,010,113.

What is lacking and what is needed are useful inexpensive nitrogen containing organic compounds with a plurality of nitrogen moieties to be mixed with bio based compounds then reacted with polyisocyanates to produce novel flame retardant urethane products. What is additionally lacking are compositions having such urea compounds and/or their salts with bio based compounds employed therein.

SUMMARY

In one aspect, the invention comprises urea and/or urea condensation compounds and their salts and bio based compounds reacted with polyisocyanates to produce flame retarded urethanes. Another aspect of the invention is a process to prepare flame retarded urethanes by serially contacting
(A) urea and/or urea condensates
(B) bio based compounds
(C) polyisocyanates under conditions sufficient to prepare the flame retarded urethane products.

In another aspect, the invention comprises urea and/or urea condensation salt of phosphorus and/or boron containing compound and bio based compounds reacted with polyisocyanates to produce flame retarded urethane and a process to prepare the flame retarded urethane comprising serially contacting:
(A) urea and/or urea condensates
(B) bio based compounds
(E) phosphorus and/or boron containing compound that will react with urea and/or a urea condensation compound.
(C) polyisocyanate.

The flame-retardant compounds of this invention are produced by mixing a urea compound with a bio based compound then adding and mixing with a polyisocyanate at ambient pressure and at ambient or elevated temperature. Any suitable temperature or pressure may be utilized in this process. Upon heating above the melting point urea form a very reactive compound isocyanic acid which will react with itself or other organic or inorganic nitrogen containing compounds especially urea compounds. In order to increase the flame retardant properties and carbonization properties of the urea condensation compound a carbonization auxiliary, such as, phosphorus oxyacid compounds, organic phosphorus compounds that will react with a urea compound, boric acid, sulfuric acid, etc., is added to the urea compounds mixed and/or reacted. Other carbonization auxiliaries may be mixed with the urea compounds and bio based compounds then reacted with the polyisocyanate to produce the flame retardant polyurethane. Fillers and carbonization auxiliaries may be added to the urea or bio based compounds.

Component A

Urea and/or urea condensates such as biuret, cyanuric acid cyamelide or a mixture of urea, biuret, cyanuric acid, ammelide and cyamelide may be utilized as component A and may be in the form of a powder, crystals, a solid or and an aqueous solution. Any suitable urea may be utilized.

Component B

Any suitable bio based compounds may be use in this invention suitable bio based compounds include but not limited to vegetable oils such as soy bean oil, cottonseed oil, safflower oil, peanut oil, sun flower oil, peanut oil, canola oil, corn oil, palm oil, rapeseed oil, and mixtures thereof, soy protein, soy milk, lignin, sodium lignin sulfonate, sodium cellulose, hemi-cellulose, sugar, corn syrup, molasses and mixtures thereof. Any oil-containing seeds nuts and kernels in which the oil can be removed and produces suitable oil that can be used in this invention may be obtained from apricot stones, avocado, bilibary, borage, stinging nettle, beach nuts, copra, cashew nut, calendula, groundnut, spurge, rubber seed, rose hip, hemp, hazelnut, raspberry, elderberry, black currant, coffee, coriander, linseed, caraway seed macadamia nut, almonds, melon seed, poppy, nutmeg, evening primrose, neem seed, niger seed, red pepper, brazil nut, passion fruit, pecon, pistachio, sea buckhom, mustard seed, sesame seed, tropho plant, tomato seed, grape seed, flax seed, walnut and citrus seed Soy bean oil and modified soy oil are preferred.

Component J

Any suitable polyisocyanate may be utilized in this invention. The commercial available polyisocyanate such as TDI, MDI, PMDI or their prepolymers and mixtures thereof are preferred. 4,4 diphenylmethane diisocyanate, 2,4 diphenylmethane diisocyanate and modified diphenylmethane dissocyanates may be utilized.

Component D

Water or any other suitable blowing agent may be utilize such as acetone, methylisobutyl ketone, Freon, mechanical froth air, methyl chloride, carbon dioxide and mixtures thereof maybe used as the blowing agent.

Component E

Urethane catalyst such as tertiary amines and organic tin catalyst and other organic metal catalyst may be utilized in this invention. Some of the amine catalyst that may be used are a mixture of 33% 1,4-diaza-bicyclo-octane and 67% dipropylene glycol, a tertiary amine blowing agent, and n,n', n", dimethylamino-propyl-hexahydrotriazine tertiary amine.

Urethane catalyst may be added to control reaction times, curing time and to effect final product qualities.

Component F

Any suitable carbonization auxiliaries may be utilized in this invention. Suitable carbonization auxiliaries are compounds that in the presence of fire assist the formation of a carbonization foam or char, such as, additives that produce acidic components in the pyrolysis mixture, such as phosphorus acids, boric acids or sulfuric acids. These acidic components are compounds such, for example, acids or salts, or their derivatives of sulfur, boron and phosphorus, such as, boron-phosphates, phosphates, and polyphosphates of ammonia, amines, polyamines, amino compounds, thioureas and alkyanolamines, but boric acid and its salts and their derivatives, organic phosphorus compounds and their salts, halogenated organic phosphorus compounds, their salts and their derivatives may also be used for this purpose. The carbonization auxiliaries and other flame retardant agents may be used in quantities of 0 to 300 percent by weight of the amino condensation compound.

The nitrogen containing salts of phosphorus acids are the preferred carbonization compounds, such as amino phosphate, amino salts of organic phosphorus compounds and amino condensation salt of inorganic and organic phosphorus compounds. The amino condensation salt of phosphorus compounds are produced by contacting the amino condensation compounds with a phosphorus containing compound that will react with an amino compound, under conditions sufficient to prepare an amino condensation salt of a phosphorus compound. Suitable phosphorus compounds include, but not limited to, phosphoric acid, pyrophosphoric acid, triphosphoric acid, metaphosphoric acid, hydrophosphorous acid, phosphinic acid, phosphorous acid, phosphinous acid, phosphine oxide, phosphorus trihalides, phosphorus oxyhalides, phosphorus oxide, mono-metal hydrogen phosphates, ammonia dihydrogen phosphate, bromated phosphates, alkali metal dihydrogen phosphate and halogenated phosphate-phosphite and their halides and acids. Organic phosphorus compounds include, but not limited to, alkyl, cyclic, aryl and alkyl-aryl phosphorus compounds, such as, alkylchlorophosphines, alkyl phosphines, alkyl phosphites, dialkyl hydrogen phosphites, dialkyl alkyl phosphonates, trialkyl phosphites, organic acid phosphates, organic diphosphonate esters, aryl phosphites, aryl hydrogen phosphates, halogenated phosphonates esters and mixtures thereof. Amino condensation borates may be produced by contacting boric acid and amino condensation compound under conditions sufficient to prepare the amino condensation borates which may also be utilized as a flame-retardant compound. Amino condensation boron-phosphates may be produced by contacting boron-phosphates and amino condensation compounds under conditions sufficient to prepare amino condensation boron-phosphate compounds which may also be utilized as a flame-retardant compound. The salt forming phosphorus containing compounds will react with the amino condensation compounds to form an amino condensation salt of a phosphorus containing compound.

Component G

Any suitable filler may be used in this invention. The fillers that may be utilized in the flame retardant mixture are usually insoluble in the reaction mixtures. They may be inorganic substances, such as, alkali metal silicates, alkaline earth metal silicates, metal silicates, silica, metals, oxides, carbonates, sulphates, phosphates, borates, glass beads or hollow glass beads. Hydrated aluminum oxide is preferred. They may be organic substances, such as, amino compounds, such as urea, melamine, dicyandiamide, and other cyanuric derivatives or their formaldehyde resins, aminophosphates, amino salts of organic phosphates, phenolaldehyde resin powder, powdered coke, graphite, graphite compounds and mixtures thereof. The organic halide flame retardant compounds may also be added as fillers. The filler may be used in the amount of 0 to 300 percentage based on the weight of the amino condensation compound.

Component H

Any suitable surfactant maybe utilized in this invention. The silicone surfactant that control cellular structure or assist in emulsifying the components maybe utilized, in the amount of 0 to 20 parts by weight.

Component I

Compounds with an active hydrogen that will react with a diisocyanate may be used in this invention. The preferred compounds with active hydrogens are polyols such as polyether polyols and polyester polyols.

Basic or acidic compounds may be utilized to adjust the pH of Component B. Suitable basic compounds include by not limited to ammonia, ammonia carbonate, sodium carbonate, sodium borate, sodium silicate, amines and polyamines. Any suitable acidic compound may be used such as organic acids and their acidic salts and mineral acids and their acidic salts.

Illustrative Embodiments

In general, the urea condensation compounds are compounds which are produced by heating urea. The heated urea first form isocyanic acid and/or cyanic acid which polymerizes with itself to form a mixture of urea, cyanuric acid and cyamelide and/or biuret.

The bio based compounds are produced from plants. These bio based compounds are renewable, less expensive, and more environmentally friendly component. They are desirable as ingredients for plastic manufacture. The consumer demand for greener products which can be renewable continues to grow.

There is a need in the industry to use renewable and relative inexpensive urea and one of the object of this invention is to produce relative inexpensive flame retardant urethane products such as insulation, panels, sound proofing, adhesives, coating agents, etc., by utilizing renewable bio based products, inexpensive urea and polyisocyanates.

One method to measure this flame retardant capability is an oxygen index test. By selecting the various combinations of the amino condensation composition to incorporate into a more flammable organic material the average limiting oxygen index (LOI) can be raised 10 to 30 percent or more when compared to otherwise comparable samples without the flame retardant amino condensation composition. For example three flexible polyurethane foams with the urea condensation composition were raised more than 30 percent to a LOI of 31.7, 30.3 and 30.7.

When the urea condensation-bio based products-polyisocyanate composition were incorporated into rigid polyurethane foam and tested with a propane torch with a 1" flame held 1" from the foam for one minute, the flame did not spread, a char was formed, and the flame went out when the torch was removed.

DESCRIPTION OF PREFERRED EXAMPLES

The present invention will now be explained herein-after by way of a few examples and comparative examples, these examples setting, however, no limits to this invention. Parts and percentages are by weight, unless otherwise indicated.

Example 1

100 parts by weight of urea is heated to above the melting point of urea and up to about 160 degree C. for 0.1 to 1 hour. Ammonia evolves from the melted urea thereby producing urea condensation composition containing urea, biuret, cyanuric acid and cyamelide. The cooled urea condensation composition is ground into a fine powder or made into an aqueous solution.

Example 2

20 parts by weight of powdered urea, 40 parts by weight of soy bean oil, 2 parts by weight of water, 1 part by weight of silicone surfactant (DOW 190), 1 part by weight of urethane catalyst (Dabco 33 Iv by AIR PRODUCTS) are mixed to form Component B. Component A, 45 parts by weight of polyisocyanate (Mondur MR by BAYER) are mixed with Component B. The mixture expand to form a rigid foam of about 2 lbs./cubic ft.

Example 3

60 parts by weight of an aqueous solution containing 40% molasses and 20% urea, 1 part by weight of silicone surfactant (DOW 190), 2 parts by weight of dimethylethanolamine, 2 parts by weight of urethane catalyst (Dabco 33 Lv by AIR PRODUCTS), 0.25 parts by weight of organic tin urethane catalyst are mixed to form Component B. Component B is then mixed with Component A which contains a polyisocyanate (Rubinate 7500 by HUNTSMAN) in the amount of 80 parts by weight. The mixture expand to form a rigid foam of about 0.5 lbs./cu. ft.

Example 4

Example 2 and 3 are modified wherein another nitrogen containing compound is added in the amount of 10 parts by weight and selected from the list below:

a) dicyandiamide
b) guanidine
c) aminoguanidine
d) thiourea
e) ethylamine
f) diethylamine
g) ammonium carbonate
h) urea carbonate
i) diethylanolamine
j) ammonium sulfamate
k) ethyl carbamate
l) ethyl isocyanate
k) biuret
l) ammonium bicarbonate
m) methylolurea
n) methylthiocyanate
o) melamine phosphate
p) urea phosphate
q) melamine borate
r) guanidine carbonate
s) aniline
t) melamine cyanurate
u) guanidine phosphate
v) acrylonitrile

Example 5

About 100 parts by weight of the urea condensation composition of example 1 is mixed with 25 parts by weight of phosphoric acid (75%) then heated to above the melting point of the urea condensation composition for about 10 minutes there by producing a urea condensation salt of phosphoric acid and use in place of urea in example 2.

The polyurethane foams produced were flame tested by applying a 2" propane flame against the foam for 5 minutes. The foams charred in the area of the flame but did not spread.

Example 6

Example 5 is modified by first reacting 5 parts by weight of boric acid with the 25 parts by weight of phosphoric acid thereby producing a boron-phosphate condensation compound and utilizing it in place of the phosphoric acid in example 5.

Example 7

Example 5 is modified wherein another phosphorus containing compound is utilized in place of phosphoric acid and selected from the list below:

a) pyrophosphoric acid
b) phosphinic acid
c) phosphorus trichloride
d) phosphorus oxytrichloride
e) phosphorus oxide
f) ammonium dihydrogen phosphate
g) mono-aluminum phosphate
h) dimethyl methyl phosphonate (DMMP)
i) dimethyl hydrogen phosphite
j) phenyl acid phosphate
k) methylchlorophosphine
l) phosphorus
m) phosphorus thiochloride
n) tris(2-chloropropyl) phosphate
o) triphenyl phosphite
p) tris 2-chloroethyl phosphite
q) triethyl phosphite
r) urea dihydrogen phosphate
s) diethyl phosphite
t) trimethyl phosphite
u) dibutyl pyrophosphoric acid
v) melamine hydrogen boron-phosphate
x) hypophosphorous acid
y) methyl amine salt of phosphoric acid
z) O,O-dimethyl hydrogen dithiophosphate

Example 8

Example 1 is modified wherein a phosphorus containing compound selected from the list in example 7 is added to the urea before it is heated thereby producing a mixture of urea condensation salt of a phosphorus containing compound and urea salt of a phosphorus containing compound. The mixture is ground into a fine powder.

Example 9

30 parts by weight of the melted urea condensation composition of example 1 are added to 100 parts by weight of a polypropylene triol with a 56 hydroxyl number and a mol wt. of 3000 thereby producing a stable emulsion for use in mixing with a bio based compound to be utilized in the production of flame retardant polyurethane products.

Example 10

Example 3 is modified wherein 20 parts by weight of powdered dimelamine phosphate is added to and mixed in with Component B. The foams were flame tested using a 2" propane flame applied to the foam for 5 minutes. The foam charred where the flame hit the foam but the flame did not spread.

Example 11

Example 3 is modified wherein 25 parts by weight of melamine powder are added to and mixed in with Component B.

Example 12

100 parts by weight of urea, 50 parts by weight of melamine powder and 20 parts by weight of boric oxide are mixed then heated above the melting point of urea and up to 160 degree C. for 45 minutes while agitating. Ammonia evolves from the solution, The urea-condensation composition containing boric oxide is cooled, then ground into a fine powder thereby producing a flame retardant urea condensation composition. 10 parts by weight of this urea condensate composition is mixed with 30 parts by weight of corn syrup. 10 parts by weight of urea, 1 part by weight of silicone surfactant (DC 187 by DOW), 2 parts by weight of a tertiary amine catalyst to form Component B. Component A consisting of polyisocyanate (Mondur MR by BAYER) in the amount of 50 parts by weight is mixed with Component B and the mixture expands to produce a rigid open cell foam of about 1 lb/cu. ft.

Example 13

15 parts by weight of biuret, 30 parts by weight of soy sause which contains fermented soy oil and sugar, 3 parts by weight of concentrated aqueous ammonia, 1 part by weight of silicone surfactant, 2 parts by weight of urethane amine catalyst (Jeffcat PMDETA by HUNTSMAN), 0.25 parts by weight of organic tin catalyst (Dabco T12 by AIR PRODUCTS) and 3 parts by weight of borax are mixed to form Component B. Component B is mixed with Component A containing 50 parts by weight of polyisocyanate, (RUBINATE M by HUNTSMAN) and the mixture expands to produce a rigid open celled foam of about 0.75 lbs./cu. ft.

Example 14

Example 13 is modified wherein another bio based compound is used in place of soy sauce and selected from the group below:

| | |
|---|---|
| a) unrefined soy oil | b) refined soy oil |
| c) fermented soy oil | d) SoyOyl |
| e) blown soy oil | f) soy protein |
| g) corn syrup | h) palm oil |
| i) rapeseed oil | J) cotton seed oil |
| k) sugar syrup | l) sodium cellulose |
| m) hemi-cellulose | n) lignin |
| o) lignin sodium sulfonate | p) sugar cane syrup |
| q) soy milk | r) mixtures of the above |

Example 15

Example 13 is modified wherein 10 parts by weight of a phosphorus salt forming compound selected from the list below is added to and reacted with biuret;

a) phosphoric acid
b) pyrophosphoric acid
c) dimethyl methyl phosphonate (DMMP)
d) dimethyl hydrogen phosphite
e) trimethyl phosphite
f) phenyl acid phosphate
g) phosphorus trichloride
h) phosphinic acid
i) phosphorus oxytrichloride
j) ammonium dihydrogen phosphate
k) dimethyl phosphoric acid
l) diethyl ethyl phosphonate
m) magnesium hydrogen phosphate
n) mono aluminum phosphate

Example 16

Example 2 is modified wherein 10 parts by weight of a halogenated flame retardant compound selected from the list below is mixed with the powdered urea condensation composition thereby producing a flame retardant amino condensation composition:
a) brominated epoxy olgmer
b) decabromodiphenyl oxide
c) pentabromodiphenyl oxide
d) 2,3-dibromopropanol
e) octabromodiphenyl oxide
f) tris(dichloropropyl)phosphite
g) tris(dichloropropyl)phosphite

Example 17

Example 3 is modified wherein 20 parts by weight of a powdered filler selected from the list below is mixed with the powdered urea condensation compound thereby producing a flame retardant urea condensation composition:

a) hydrated aluminum oxide powder
b) hydrated sodium silicate powder
c) melamine
d) dicyandiamide -continued e) urea
f) melamine phosphate
g) melamine borate
h) ammonium phosphate
i) ammonium pyrophosphate
j) ammonium carbonate
k) ammonium borate
l) ammonium sulfamate
m) guanidine
n) guanidine carbonate
o) urea phosphate
p) silica powder
q) phenol-formaldehyde resin powder
r) aluminum phosphate
s) thiourea
t) hollow beads
u) expandable graphite
v) melamine salt of DMMP
r) ammonium sulfate
s) magnesium chloride
t) antimony trioxide
u) boron-phosphate powder
w) melamine boron-phosphate powder
x) ammonium boron-phosphate powder

Example 18

30 parts by weight of the urea condensation composition of example 2 are mixed and reacted with 10 parts by weight of dimethyl methyl phosphonate (DMMP) thereby producing a urea condensation salt of DMMP composition, then 10 parts by weight of the urea condensation salt of dimethyl methyl phosphonate was mixed with 20 parts by weight of unrefined soy oil, 5 parts by weight of urea and 2 parts by weight of tripropylene glycol then mixed with 20 parts by weight of polyisocyanate (RUBINATE M by HUNTSMAN). The mixture cures into a micro cellular urethane.

The micro cellular urethane foam was flame tested using a 2" propane flame placed against the foam for 5 minutes. The foam charred in the area of the flame but did not spread.

Example 19

Example 18 is modified wherein another polyisocyanate is used in place of RUBINATE M and selected from the list below:

a) RUBINATE 7500 by HUNTSMAN
b) MONDUR MR by BAYER
c) 4,4 diphenylmethane diisocyanate
d) 2,4 diphenylmethane diisocyanate

Example 20

30 parts by weight of urea, 10 parts by weight of safflower oil and 30 parts by weight of water are mixed and heated until the urea goes into solution then 70 parts by weight of polyisocyanate (MONDUR MR by BAYER) is added, mixed and reacted thereby producing a rigid, micro cellular foam.

Example 21

30 parts by weight of the urea, 30 parts by weight corn syrup and 20 parts by weight of soy milk are mixed then heated to 100 degree C. until the urea goes into solution then 1 part by weight of silicone surfactant is added and mixed. To this mixture 80 parts by weight of polyisocyanate (RUBINATE M by HUNTSMAN) is added and mixed and reacted to produce a rigid open cell polyurethane foam.

The rigid open cell polyurethane foam was flame tested using a 2" propane flame placed against the foam for 5 minutes. The foam charred but the flame did not spread.

Example 22

Example 21 is modified wherein an amino phosphorus containing compounds is selected from the list below and added to the corn syrup:

a) dimelamine phosphate
b) dicyandiamide phosphate
c) urea dihydrogen phosphate
d) guanidine phosphate
e) aminoguanidine phosphate
f) diethyltriamine urea phosphate
g) melamine salt of dimethyl methyl phosphonate
h) melamine salt of dimethyl hydrogen phosphite
i) methylamine melamine phosphoric acid
j) methyl carbamate salt of phosphoric acid
k) melamine salt of boron-hydrogen phosphate
l) O-methyl urea
m) urea salt of boron-phosphate
n) urea-formaldehyde phosphate
o) aminophenol phosphate
p) ammonium urea phosphate
q) ammonium melamine phosphate
r) melamine salt of trimethyl phosphite
s) melamine salt of phenyl acid phosphate

Example 23

20 parts by weight of and aqueous solution containing 50% urea, 15 parts by weight of cane syrup, 5 parts by weight of soy milk which contains water, soy protein, soy bean oil, sugar, soy lecithin, soy bean fiber and hemicellulose, 1 part by weight of silicone surfactant, 0.1 part by weight of tin catalyst and 2 parts by weight of tertiary amine (JEFCAT ZF 22 by HUNTSMAN) are mixed to form Component B. Component A, polymeric MDI, and Component B are mixed. The mixture expands to produce an open cell rigid foam of about 1 lb./cu. ft.

The open cell rigid foam was flame tested using a 2" propane flame placed against the foam for 5 minutes, The foam charred in the area of the flame but the flame did not spread.

Example 24

30 parts by weight of urea beads, 5 parts by weight of Safflower oil and 30 parts by weight of water are mixed then heated to 100 degrees C. while agitating until the urea goes into solution. This solution is cooled the 60 parts by weight of polyisocyanante (MONDUR MR by BAYER) is added and mixed. Them mixture reacts and forms a microcellular rigid foam.

Example 25

Example 24 is modified wherein another vegetable oil is use in place of safflower oil and selected from the list below:

| | |
|---|---|
| a) unrefined soy bean oil | b) refined soy bean oil |
| c) blown soy oil | d) soyOyl |
| e) unrefined cottonseed oil | f) refined cottonseed oil |
| g) corn oil | h) flaxseed oil |
| i) sunflower seed oil | j) peanut oil |
| k) castor seed oil | l) canola oil |
| m) rapeseed oil | n) crambe oil |
| o) jojoba oil | p) soy milk |

Example 26

Example 23 is modified wherein another bio based compound is used in place of cane syrup and selected from the list below:

| | |
|---|---|
| a) molasses | b) sugar |
| c) maple syrup | d) honey |
| e) lignin | f) sodium lignin sulfonate |
| g) sodium cellulose | h) hemi-cellulose |

Example 27

40 parts by weight of aqueous solution containing 45% urea, 10% lignin, 10% sodium lignin sulfonate, 5% hemi-cellulose and 5% sodium cellulose, 2% silicon surfactant, 2% tertiary amine, 0.25% tin urethane catalyst are mixed to form Component B. Component A, 40 parts by weight of polyisocyanate (PAPA 27 by DOW) and Component B are mixed and reacted to form a open cell rigid foam of about 1 lb./cu. ft.

I claim:

1. A flame retardant polyurethane composition produced by the process consisting of mixing and reacting the following components:
   Component B consisting of
   (A) urea and/or urea condensates, in the amount of 50 to 200 parts by weight;
   (B) soy oil, in the amount of 50 to 200 parts by weight;
   (C) water, in the amount of 0 to 200 parts by weight;
   (D) blowing agent, in the amount of 0 to 50 parts by weight;
   (E) urethane catalyst, in the amount of 0 to 20 parts by weight;
   (F) carbonization auxiliaries, in the amount of 0 to 50 parts by weight;
   (G) surfactant, 0 to 20 parts by weight;
   (H) compound with an active hydrogen that will react with a polyisocyanate, in the amount of 0 to 100 parts by weight;
   Component A consisting of:
   (I) polylsocyanate, selected from the group consisting of 4,4 diphenylmethane diisocyanate 2,4 diphenylmethane diisocyanate and mixtures thereof, in the amount of 50 to 400 parts by weight;
   Component A and Component B are mixed and reacted.

2. A flame retardant polyurethane composition produced by the process comprising of mixing and reacting the following components:
   Component B consisting of
   (A) urea and/or urea condensates, in the amount of 50 to 200 parts by weight;
   (B) bio based compound selected from the group consisting of molasses, corn syrup, sugar and mixtures thereof,
   (C) water, in the amount of 0 to 200 parts by weight;
   (D) blowing agent, in the amount of 0 to 50 parts by weight;
   (E) urethane catalyst, in the amount of 0 to 20 parts by weight;
   (F) carbonization auxiliaries, in the amount of 0 to 50 parts by weight;
   (G) surfactant, 0 to 20 parts by weight;
   (H) compound with an active hydrogen that will react with a polyisocyanate, in the amount of 0 to 100 parts by weight;
   Component A consisting of:
   (I) polyisocyanate, selected from the group consisting of 4,4 diphenylmethane diisocyanate, 2,4 diphenylmethane disocyanate and mixtures thereof, in the amount of 50 to 400 parts by weight;
   Component A and Component B are mixed and reacted.

3. A method for producing flame retardant urethane compositions consisting of mixing and reacting the following components;
   Component B consisting of:
   (A) urea and/or urea condensate, in the amount of 50 to 200 parts by the weight;
   (B) bio based compound selected from the group consisting of vegetable oil, molasses, corn syrup, sugar and mixtures thereof, in the amount of 50 to 200 parts by weight,
   (C) water, in the amount of 0 to 200 parts by weight;
   (D) blowing agent, in the amount of 0 to 200 parts by weight;
   (E) urethane catalyst, in the amount of 0 to 20 parts by weight;
   (F) carbonization auxiliaries: 0 to 50 parts by weight;
   (G) surfactant, 0 to 20 parts by weight;
   (H) compound with an active hydrogen that will react with a polyisocyanate, in the amount of 0 to 100 parts by weight;
   Component A consisting of:
   (I) polyisocyanate, selected from the group consisting of 4,4 diphenylmethane diisocyanate, 2,4 diphenylmethane diisocyanate and mixtures thereof, in the amount of 50 to 400 parts by weight;
   Component A and Component B are mixed and reacted.

* * * * *